F. G. SIGRIST.
SELF CLEANING RAKE.
APPLICATION FILED AUG. 24, 1914.
1,145,809.
Patented July 6, 1915.
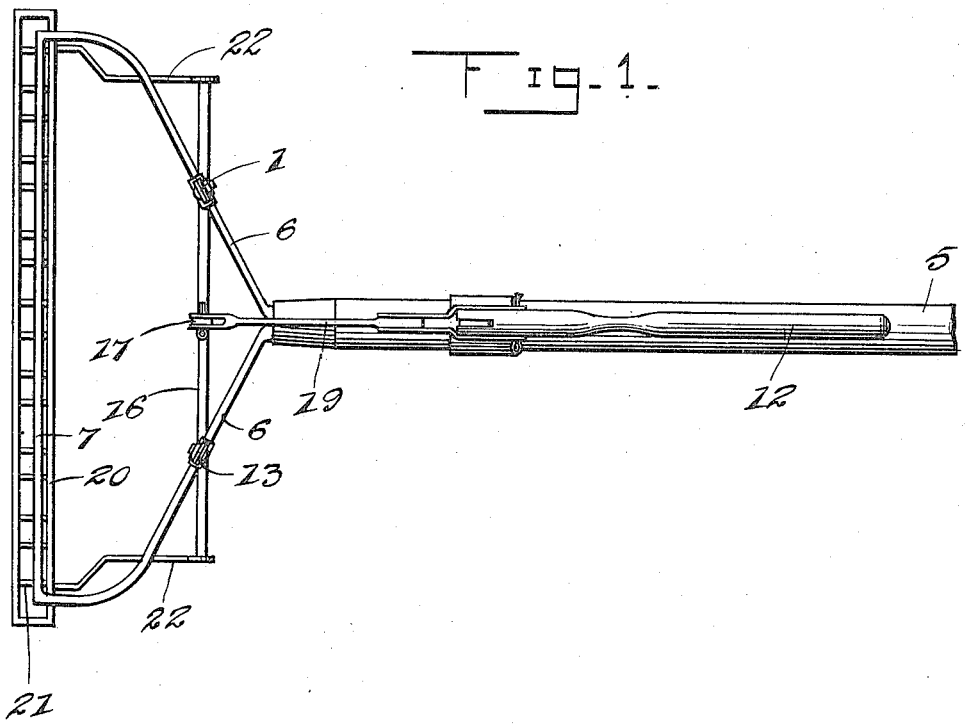
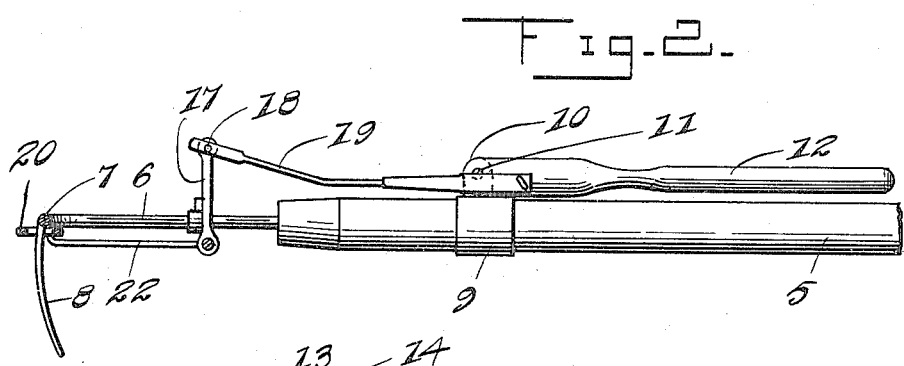
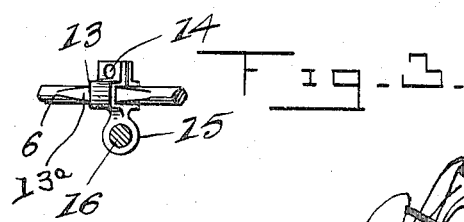

UNITED STATES PATENT OFFICE.

FREDERICK G. SIGRIST, OF ROCHESTER, MISSOURI.

SELF-CLEANING RAKE.

1,145,809.  Specification of Letters Patent.  Patented July 6, 1915.

Application filed August 24, 1914. Serial No. 858,282.

*To all whom it may concern:*

Be it known that I, FREDERICK G. SIGRIST, a citizen of the United States, residing at Rochester, in the county of Andrew and State of Missouri, have invented certain new and useful Improvements in Self-Cleaning Rakes; and I do hereby declare the following to be a full, clear, and exact description of the invention, such as will enable others skilled in the art to which it appertains to make and use the same.

This invention relates to improvements in rakes and more particularly to an attachment for rakes specially designed for quickly and conveniently removing trash or rubbish from the teeth thereof.

With this and other objects in view, the invention consists in the novel construction, arrangement and formation of parts as will be hereinafter specially described, claimed and illustrated in the accompanying drawings, in which—

Figure 1 represents a top plan view, partly broken away, of the improved rake, Fig. 2 represents a side elevation, partly broken away, of the rake, Fig. 3 represents an enlarged detail view, partly broken away, of the detachable bearing member for the rock shaft.

Referring to the drawing in detail, wherein similar reference numerals designate corresponding parts throughout the several views, the numeral 5 indicates the handle of the rake, carrying at one end a pair of diverging arms 6 at the outer extremities of which are secured the rake head 7 provided with usual teeth 8.

A sleeve 9 is adjustably secured to the handle 5 adjacent the end carrying the rake head 7 and is formed with an upstanding ear 10 pivotally connected by a pin 11 with a hand lever 12. A pair of rectangular split sleeves 13 are adjustable on the squared portions 13ª of the diverging arms 6 and are adapted to be secured in adjusted position by bolts or the like 14. Bearing members 15 are formed integral with the sleeves 13 and rotatably receive a rock shaft 16. The shaft 16 is provided centrally with an upstanding crank arm 17 pivotally secured at 18 to the connecting rod 19 having connection at its opposite extremity to the hand lever 12 at a point outwardly of the pivotal axis 11 of the hand lever.

A cleaner bar 20 is slidably positioned over the teeth 8 of the rake and includes a plurality of transverse bars 21 extending between the teeth of the rake. The rock shaft 16 is provided at its opposite ends with parallel crank arms 22 secured at their outer extremities to the cleaner frame 20 whereby when the shaft 16 is rotated by an actuation of the hand lever 12 the cleaner frame 20 is moved downwardly over the teeth, thus effectively cleaning the latter.

What is claimed is:—

1. In a rake, a handle, a pair of outwardly diverging arms carried by said handle, a rake head carried by said diverging arms provided with curved teeth, a cleaner frame slidable over said teeth, a rock shaft rotatably supported by said diverging arms, connections between said rock shaft and said cleaner frame, a hand lever pivotally secured to said handle, a crank arm secured centrally of said rock shaft, and an angular connecting rod between said crank arm and said hand lever.

2. In a rake, a handle, a pair of outwardly diverging arms carried by said handle, a rake head carried by said diverging arms provided with curved teeth, a cleaner frame slidable over said teeth, bearing members adjustably secured to said diverging arms, a rock shaft rotatably mounted in said bearing members, connections between said rock shaft and said cleaner frame, a hand lever pivotally secured to said handle, a crank arm secured centrally of said rock shaft, and an angular connecting rod between said crank arm and said hand lever.

In testimony whereof I affix my signature in presence of two witnesses.

FREDERICK G. SIGRIST.

Witnesses:
 JOHN E. MCBRIDE,
 R. E. SIGRIST.

Copies of this patent may be obtained for five cents each, by addressing the "Commissioner of Patents, Washington, D. C."